US007885785B1

(12) United States Patent
Pekarek et al.

(10) Patent No.: US 7,885,785 B1
(45) Date of Patent: Feb. 8, 2011

(54) ROTOR POSITION SENSING APPARATUS AND METHOD USING PIEZOELECTRIC SENSOR AND HALL-EFFECT SENSOR (75) Inventors: Steven D. Pekarek, West Lafayette, IN (US); Philip B. Beccue, Clayton, OH (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 11/953,003

(22) Filed: Dec. 7, 2007

Related U.S. Application Data (60) Provisional application No. 60/868,983, filed on Dec. 7, 2006, provisional application No. 60/869,138, filed on Dec. 8, 2006.

(51) Int. Cl.
*G01L 3/10* (2006.01)
(52) U.S. Cl. ............... 702/151; 702/150; 702/145; 318/400.01; 318/400.23
(58) Field of Classification Search ............... 702/151, 702/145, 150; 318/712, 432, 721–723, 400.01, 318/400.23
See application file for complete search history.

(56) References Cited

U.S. PATENT DOCUMENTS

| 5,872,416 A * | 2/1999 | Nogarede ............... 310/323.03 |
| 6,883,373 B2 * | 4/2005 | Dyer ............... 73/462 |
| 2005/0248306 A1 * | 11/2005 | Chen et al. ............... 318/712 |

OTHER PUBLICATIONS

V. Olarescu, S. Musuroi, "Enhanced Simplified Control Algorithm for Surface-Mounted Permanent Magnet Synchronous Motors With Sinusoidal Excitation," *IEEE Proceedings From The International Power Electronics and Motion Control Conference*, Aug. 2004, pp. 1049-1053.
K. A. Corzine, S. D. Sudhoff, "A Hybrid Observer for High Performance Brushless DC Motor Drives," *IEEE Transaction on Energy Conversion*, vol. 11, No. 2, pp. 318-323, Jun. 1996.
X. Zheng, L. Tiecai, L. Yongping, G. Bingyi, "Position-Measuring Error Analysis and Solution of Hall Sensor in Pseudo-Sensorless PMSM Driving System," *IEEE Proceedings from the Industrial Electronics Conference*, Nov. 2003, pp. 1337-1342.
Z. Zhao-yong, Z. Zheng, L. Tie-cai, "FPGA Implementation of a New Hybrid Rotor Position Estimation Scheme Based on Three Symmetrical Locked Hall Effect Position Sensors," *IEEE Proceedings from the International Power Electronics and Motion Control Conference*, Aug. 2004, pp. 1592-1596.
Z. Jibin, X. Yongxiang, H. Jianhui, Z. Hongwei, "Sinusoidal Commutation of a High-Speed PM Synchronous Motor With One Discrete Hall Sensor," *IEEE Proceedings from the International Power Electronics Congress*, Oct. 2002, pp. 115-119.

(Continued)

*Primary Examiner*—Drew A Dunn
*Assistant Examiner*—Hien X Vo
(74) *Attorney, Agent, or Firm*—William F. Bahret (57) ABSTRACT A position observer for control-based torque ripple mitigation in permanent magnet synchronous machines (PMSMs). Rotor position is determined using data from two sources: a piezoelectric sensor for initial position and low-speed detection, and a single Hall-effect sensor for high-speed detection.

11 Claims, 8 Drawing Sheets

OTHER PUBLICATIONS

J. Shen, Z. Zhu, D. Howe, "PM Brushless Drives With Low-Cost and Low-Resolution Position Sensors," *IEEE Proceedings from the International Power Electronics and Motion Control Conference*, Aug. 2004, pp. 1033-1038.

J. Bu, L. Xu, T. Sebastian, B. Liu, "Near-Zero Speed Performance Enhancement of PM Synchronous Machines Assisted by Low-Cost Hall Effect Sensors," *IEEE Proceedings from the Applied Power Electronics Conference*, Feb. 1998, pp. 64-68.

F. Capponi, G. Donato, L. Ferraro, O. Honorati, M. Harke, R. Lorenz, "AC Brushless Drive With Low Resolution Hall-Effect Sensors for an Axial Flux PM Machine," *IEEE Proceedings from the Industry Application Conference*, Oct. 2004, pp. 2382-2389.

H. Le-Huy, R. Perret, R. Feuillet, "Minimization of Torque Ripple in Brushless DC Motor Drives," *IEEE Transactions on Industry Applications*, vol. 22, No. 4, pp. 803-813, Jul./Aug. 1986.

C. Kang, I. Ha, "An Efficient Torque Control Algorithm for BLDCM With a General Shape Back-EMF," *PESC Record-Power Electronics Specialists Conference*, 1993, pp. 451-457.

D. C. Hanselman, "Minimum Torque Ripple, Maximum Efficiency Excitation of Brushless Permanent Magnet Motors," *IEEE Transactions on Industrial Electronics*, vol. 41, No. 3, pp. 292-300, Jun. 1994.

R. Leidhold, G. Garcia, and E. Watanabe, "PMAC Motor Control Strategy, Based on the Instantaneous Active and Reactive Power, for Ripple-Torque and Copper-Losses Minimization," *IEEE Proceedings from the Industrial Electronics Society Conference*, Oct. 2000, pp. 1401-1405.

S. Park, H. Park, M. Lee and F. Harashima, "A New Approach for Minimum-Torque Ripple Maximum-Efficiency Control of BLDC Motor," *IEEE Transactions on Industrial Electronics*, vol. 47, No. 1, pp. 109-114, Feb. 2000.

C. D. Angelo, G. Bossio, G Garcia, J. Solsona, M. I. Valla, "Sensorless Speed Control of Permanent Magnet Motors With Torque Ripple Minimization," *IEEE Proceedings from the Industrial Society Annual Conference*, Nov. 2002, pp. 680-685.

P. L. Chapman, S. D. Sudhoff, C. A. Whitcomb, "Optimal Current Control Strategies for Surface-Mounted Permanent-Magnet Synchronous Machine Drives," *IEEE Transactions on Energy Conversion*, vol. 14, No. 4, pp. 1043-1050, Dec. 1999.

A. Wu and P. Chapman, "Cancellation of Torque Ripple Due to Nonidealities of Permanent Magnet Synchronous Machine Drives," *IEEE Proceedings from the Power Electronics Specialist Conference*, Jun. 2003, pp. 256-261.

J. Holtz and L. Springob, "Identification and Compensation of Torque Ripple in High-Precision Permanent Magnet Motor Drives," *IEEE Transactions on Industrial Electronics*, vol. 43, No. 2, pp. 309-320, Apr. 1996.

S. Chen, A. Song, and T. Sekiguchi, "High Efficiency and Low Torque Ripple Control of Permanent Magnet Synchronous Motor Based on the Current Tracking Vector of Electromotive Force," *IEEE Proceedings from the Industrial Applications Conference*, Oct. 2000, pp. 1725-1729.

J. Hung and Z. Ding, "Design of Currents to Reduce Torque Ripple in Brushless Permanent Magnet Motors," *IEEE Proceedings Part B from Electric Power Applications*, vol. 140, No. 4, pp. 260-266, Jul. 1993.

S. Clenet, Y. Lefèvre, N. Sadowski, S. Astier, and M. Lajoie, "Compensation of Permanent Magnet Motors Torque Ripple by Means of Current Supply Waveshapes Control Determined by Finite Element Method," *IEEE Transactions on Magnetics*, vol. 29, No. 2, pp. 2019-2023, Mar. 2003.

T. Liu, I. Husain, and M. Elbuluk, "Torque Ripple Minimization With On-Line Parameter Estimation Using Neural Networks in Permanent Magnet Synchronous Motors," *IEEE Proceedings from the Industry Applications Conference*, Oct. 1998, pp. 35-40.

T. S. Low, K. J. Tseng, T. H. Lee, K. W. Lim, and K. S. Lock, "Strategy for the Instantaneous Torque Control of Permanent-Magnet Brushless Dc Drives," *IEEE Proceedings Part B from Electric Power Applications*, vol. 137, No. 6, Nov. 1990, pp. 355-363.

N. Matsui, T. Makino, and H. Satoh, "Autocompensation of Torque Ripple of Direct Drive Motor by Torque Observer," *IEEE Transactions on Industry Applications*, vol. 29, No. 1, pp. 187-194, Jan./Feb. 1993.

T. Low, T. Lee, K. Tseng, and K. Lock, "Servo Performance of a BLDC Drive With Instantaneous Torque Control," *IEEE Transactions on Industrial Applications*, vol. 28, No. 2, pp. 455-462, Mar./Apr. 1992.

G. Ferretti, G. Magnani, and P. Rocco, "Torque Ripple Adaptive Rejection in Brushless Motors," *IEEE/ASME Proceedings from the International Conference on Advanced Intelligent Mechatronics*, Sep. 1999, pp. 329-334.

F. Colamartino, C. Marchand, and A. Razek, "Considerations of Non-Sinusoidal Field Distribution in a Permanent Magnet Synchronous Motor Control," *IEEE Proceedings from the Power Electronics and Variable-Speed Drives Conference*, Oct. 1994, pp. 508-513.

S. Li, Z. Zhizhong, and L. Yongping, "Compensation of Ripple Torque of Inverter-Fed PM Synchronous Motors," *IEEE Proceeding from the American Control Conference*, Jun. 2000, pp. 1597-1601.

F. Parasiliti, R. Petrella, M. Tursini, "Torque Ripple Compensation in Permanent Magnet Synchronous Motors Based on Kalman Filter," *IEEE Proceedings from International Industrial Electronics*, Jul. 1999, pp. 1333-1338.

F. Colamartino, C. Marchand, and A. Razek, "Torque Ripple Minimization in a Permanent Magnet Synchronous Servodrive," *IEEE Transactions on Energy Conversion*, vol. 14, No. 3, pp. 616-621, Sep. 1999.

O. Bogosyan, M. Gokasan, and A. Sabanovic, "Robust-Adaptive Linearization With Torque Ripple Minimization for a PMSM Driven Single Link Arm," *IEEE Proceedings from the International Conference on Industrial Electronics, Control, and Instrumentation*, Nov. 1997, pp. 102-107.

V. Petrovic, R. Ortega, A. M. Stankovic, and G. Tadmor, "Design and Implementation of an Adaptive Controller for Torque Ripple Minimization in PM Synchronous Motors," IEEE Transactions on Power Electronics, vol. 15, No. 5, pp. 871-880, Sep. 2000.

W. Qian, S. Panda, and J. Xu, "Torque Ripple Minimization in PM Synchronous Motors Using Iterative Learning Control," IEEE Transactions on Power Electronics, vol. 19, No. 2, pp. 272-279, Mar. 2004.

T. Su, S. Hattori, M. Ishida, T. Hori, "Suppression Control Method for Torque Vibration of AC Motor Utilizing Repetitive Controller With Fourier Transform," *IEEE Transactions on Industry Applications*, vol. 38, No. 5, pp. 1316-1325, Sep./Oct. 2002.

P. Beccue, J. Neely, S. Pekarek, D. Stutts, "Utilization of a Piezoelectric Polymer to Sense Harmonics of Electromagnetic Torque," *IEEE Power Electronics Letters*, vol. 1, No. 3, pp. 69-73, Sep. 2003.

P. Beccue, J. Neely, S. Pekarek, D. Stutts, "Measurement and Control of Torque Ripple-Induced Frame Torsional Vibration in a Surface Mount Permanent Magnet Machine," *IEEE Transactions on Power Electronics*, vol. 20, No. 1, pp. 182-191, Jan. 2005.

S. Pekarek, P. Beccue, "Using Torque-Ripple Induced Vibration to Determine the Initial Rotor Position of a PM Synchronous Machine," *IEEE Transactions on Power Electronics*, vol. 21, No. 3, May 2006, pp. 818-821.

* cited by examiner

ROTOR POSITION SENSING APPARATUS AND METHOD USING PIEZOELECTRIC SENSOR AND HALL-EFFECT SENSOR

CROSS REFERENCE TO RELATED APPLICATIONS

This application claims the benefit of U.S. Provisional Patent Application No. 60/868,983, filed Dec. 7, 2006, and application No. 60/869,138, filed Dec. 8, 2006.

GOVERNMENT RIGHTS

This invention was made with government support under N00024-02-C-4056 with the Naval Sea Systems Command. The government has certain rights in the invention.

BACKGROUND OF THE INVENTION

This invention relates to electric motor controls, and more particularly to devices and methods for determining the position of a rotor of an electric motor.

In drive-based control of permanent magnet synchronous machines (PMSM), knowledge of rotor position is required to control electromagnetic torque. In practice, numerous methods of measuring or estimating position are applied. Traditionally, for machines that have a trapezoidal back-emf, 120° square wave excitation is utilized. Under 120° excitation, three Hall-effect sensors placed at 120° intervals provide sufficient knowledge of position to achieve control of speed or average torque. For machines that have a sinusoidal back-emf, applied excitation it typically sinusoidal. Therefore, more precise knowledge of rotor position is required. Over the past several years, significant effort has been placed on the use of discrete Hall-effect sensors to estimate rotor position for sinusoidal PMSMs [1-8]. Research has focused primarily upon the integration of an estimated rotor velocity to interpolate the rotor position between sensor transitions. Specifically, in [1-5], a zero-order Taylor series approximation of the integral is used. In other words, the average rotor speed is calculated from the previous sensor state and is integrated to determine rotor position between sensor transitions. In [6-8], a first-order Taylor series approximation of the integral that uses the average rotor speed from the previous sensor state and the average angular acceleration calculated from the previous two sensor states is used to determine the rotor position. In [1-4, 7-8], 120° square wave excitation is commanded versus sinusoidal excitation for start-up and low-speed operation.

In [5-6], observers are presented that utilize a single Hall-effect sensor for position estimation. Although effective at higher speeds, the error bound at zero speed is on the order of ±90° electrical. Therefore, in [5], the motor is started using a sinusoidal excitation with a fixed frequency until the rotor has achieved sufficient speed. In [6], the motor is aligned to a known position and then started on a pre-determined position profile.

Although, the methods in [1-8] have shown reasonable success, they have limitations. Specifically in [1-4, 7-8], the use of three Hall-effect sensors limits the guaranteed starting torque to 87% of maximum starting torque. In [5-6], the use of a single Hall-effect sensor further reduces the guaranteed maximum starting torque. Specifically, in [6], the synchronous excitation used during start-up can result in low starting torque and in an initial reverse rotation of the rotor. For the start-up strategy used in [6], a guaranteed starting torque cannot be determined without knowledge of the rotational inertia of machine and load and the synchronous excitation frequency. In [7], the force alignment of the rotor during start-up can result in reverse rotation of the motor, and the guaranteed starting torque is less than 71% of the maximum starting torque available.

Although there is some reduction in performance, Hall-effect-based position observers provide a drive system designer with a tool for reducing cost (i.e. compared to using more expensive in-line techniques). Moreover, reduced-count observers provide an additional advantage in that they improve a drive's fault tolerance. Thus both have found widespread use in numerous applications including automotive actuators, home appliances, and industrial equipment. Seemingly unrelated to Hall-effect-based position observers, a topic that has also received considerable attention recently is the mitigation of torque ripple in PMSMs. Specifically, in many of the applications that call for a reduction in drive system cost, an additional constraint is added that the acoustic noise/vibration created by the drive must be eliminated (or at least minimized). In PMSM drives, a dominant source of noise and vibration is created by torque ripple that results from stator/rotor field interaction as well as cogging torque.

Over the past decade several controllers have been proposed that adjust stator current harmonics to mitigate torque ripple [9-33]. However, the majority of the techniques require knowledge of machine parameters (back-emf and cogging torque coefficients). Moreover, validation of torque ripple mitigation controllers has typically used in-line high performance (relatively costly) position sensors. This has led to a common perception that torque ripple mitigation requires the use of a precise position encoder.

Recently, a series of studies have shown a possible path toward cost-effective control-based torque-ripple mitigation in mass-produced drives [34-36]. Specifically, to eliminate the need to obtain knowledge of machine parameters, a piezoelectric polyvinylidene fluoride (PVDF) polymer film is used in [34] to detect torque-ripple-induced vibration. The advantage of the sensor is that it is relatively low cost and straightforward to implement in a drive system. Using the sensor for torque ripple feedback, a mitigation algorithm based upon cost-function minimization is developed in [35]. The controller is applicable for machines with arbitrary back-emf and cogging torque waveforms. In [36], vibration created by torque ripple has been shown to be useful in predicting initial rotor position.

SUMMARY OF THE INVENTION

The invention provides a method of rotor position sensing for permanent magnet synchronous machines (PMSMs) over a wide speed range. In one embodiment, rotor position is determined using data from two sources: a piezoelectric sensor for initial position and low-speed detection, and a single Hall-effect sensor for high-speed detection.

As one aspect of the invention, a coupled piezoelectric/single-Hall-effect (CPSH) sensor-based position observer is derived. The CPSH in one embodiment uses a zero order Taylor Series approximation of the integral of rotor velocity to estimate rotor position between Hall-effect sensor transitions. During startup and at low rotor speeds the piezoelectric washer is used to determine the rotor position (in addition to its primary mission of providing feedback for torque ripple mitigation).

Several advantages of the observer are 1) near-maximum start-up torque is guaranteed 2) no reverse rotation of the rotor occurs during startup, 3) sufficient precision of rotor position is estimated to achieve torque harmonic control, 4) the observer does not require knowledge of back-emf or cogging torque harmonics, 5) is applicable to machines with arbitrary back-emf waveform and stator slot configuration, and 6) is relatively low-cost.

One embodiment of the CPSH has been validated in hardware using a 3-phase, 8-pole, 1 slot/pole/phase machine. Through experiment, it is shown that start-up performance nearly matches that of start-up obtained using an in-line position encoder. In addition, when the torque ripple mitigation algorithm is applied, the 6th and 12th order harmonics of torque are eliminated. Thus a conclusion is that by adding a vibration sensor to any PMSM drive (sinusoidal, trapezoidal, etc), a drive designer can reduce the number of hall sensors, improve start-up performance, and eliminate torque-ripple-induced vibration.

Other objects and advantages of the present invention will be more apparent upon reading the following detailed description in conjunction with the accompanying drawings.

DESCRIPTION OF PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as illustrated therein being contemplated as would normally occur to one skilled in the art to which the invention relates.

I. Measurement and Mitigation of Torque Ripple Induced Vibration

Figure 1:
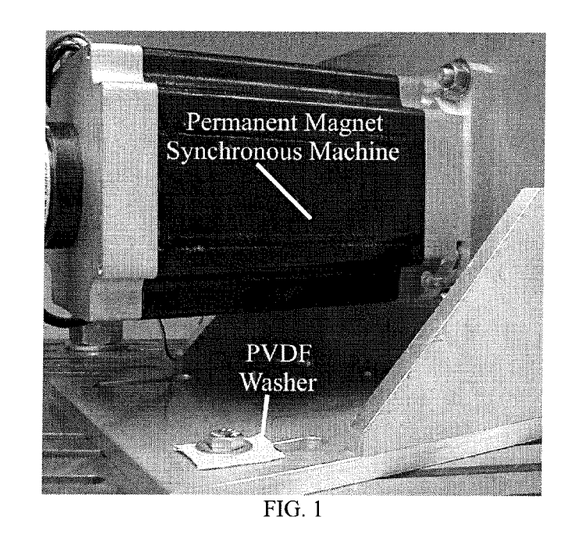
FIG. 1: Vibration sensor as washer on mount.

The position observer disclosed herein utilizes a piezoelectric polymer, whose primary function is to provide torque ripple feedback. A picture of the sensor implementation is shown in FIG. 1. Therein, it can be seen that the sensor is a washer that is placed on a bolt on the machine's mount bracket. Details of the sensor properties are described in [34]. Although production-level cost assessment has not been performed, a single sensor was constructed in-house for a few dollars (US). It is expected that in mass-production cost of a single sensor would be a fraction of a dollar.

Since one of the functions of the sensor is to provide torque ripple feedback and one of the contributions of the paper is to show the position observer provides sufficient accuracy for torque ripple mitigation, it is useful to briefly review the torque ripple mitigation algorithm presented in [35]. The algorithm is also described in U.S. Pat. No. 7,117,754 to Neely et al., entitled Torque Ripple Sensor and Mitigation Mechanism, which patent is incorporated herein by reference. In addition, an enhancement to the algorithm is made that provides a means to compensate for sensor delay.

A. Electromagnetic Torque

To start, a closed-form expression for the electromagnetic torque of a PMSM is established using an energy balance approach [37], which yields:

$$T_e = \frac{P}{2}\left(i_{as}\frac{\partial \lambda_{asm}}{\partial \theta_r} + i_{bs}\frac{\partial \lambda_{bsm}}{\partial \theta_r} + i_{cs}\frac{\partial \lambda_{csm}}{\partial \theta_r}\right) + T_{cog} \quad (1)$$

where $$\lambda_{asm} = \lambda_{mag}\sum_{m \in M} \kappa_{em}\sin(m\theta_r) \quad (2)$$

$$\lambda_{bsm} = \lambda_{mag}\sum_{m \in M} \kappa_{em}\sin(m(\theta_r - 120°)) \quad (3)$$

$$\lambda_{csm} = \lambda_{mag}\sum_{m \in M} \kappa_{em}\sin(m(\theta_r + 120°)) \quad (4)$$

are expressions for the influence of the flux of the permanent magnets on the respective stator windings, $i_{as}$, $i_{bs}$, and $i_{cs}$ are stator phase currents, $\kappa_{em}$ is the magnitude of the mth Fourier harmonic coefficient, $\lambda_{mag}$ is a coefficient defined such that $\kappa_{e1}=1$, $\omega_r$ is the electrical rotor angular velocity, and P is the number of poles. The set M={m=2x−1:x∈Z*, $\kappa_{em} \neq 0$}, where Z* is the set of positive integers, and the angle $\theta_r$ represents the electrical rotor position that is defined such that at $\theta_r=0$, no fundamental rotor flux links the as-winding. The term $T_{cog}$ represents the torque resulting from interaction of the permanent magnets and the stator teeth (cogging torque). Herein for simplicity and with lack of generality, the machine is assumed to be wound full pitch and has an integer number of slots/pole/phase. Under this assumption the influence of the flux of the permanent magnets on the respective stator windings (2)-(4) can be modeled as having odd symmetry and therefore the cosine terms of the Fourier series are eliminated. In addition, the cogging torque can be expressed as a function of the 6th order harmonics of rotor angular position. For alternative winding configurations, the approach described herein remains the same, although mathematical derivation is more tedious. Mathematically, the cogging torque can be expressed as $$T_{cog} = \sum_{y \in Y} T_{cqy}\cos(y\theta_r) + T_{cdy}\sin(y\theta_r) \quad (5)$$

where $Y=\{y=6x:x \in Z^*, T_{cqy} \neq 0 \cup T_{cdy} \neq 0\}$. It is assumed that the stator currents can be represented in series form as:

$$i = \sum_{n \in N} \kappa_{iqn}\cos(n\theta_r) + \kappa_{idn}\sin(n\theta_r) \quad (6)$$

$$i_{bs} = \sum_{n \in N} \kappa_{iqn}\cos(n(\theta_r - 120°)) + \kappa_{idn}\sin(n(\theta_r - 120°)) \quad (7)$$

$$i_{cs} = \sum_{n \in N} \kappa_{iqn}\cos(n(\theta_r + 120°)) + \kappa_{idn}\sin(n(\theta_r + 120°)) \quad (8)$$

The set $N=\{n=2x-1, n \neq 3y: x \in Z^*, y \in Z^*, \kappa_{iqn} \neq 0 \cup \kappa_{idn} \neq 0\}$.

Substituting (2)-(8) into (1) and manipulating the final result, the electromagnetic torque may be represented as $$T_e = \overline{T}_e + \sum_{y \in Y} T_{eqy}\cos(y\theta_r) + T_{edy}\sin(y\theta_r) \quad (9)$$

where $$\overline{T}_e = \frac{3P\lambda_{mag}}{4}\sum_{n \in N} \kappa_{en}\kappa_{iqn} \quad (10)$$

represents that average electromagnetic torque produced by the machine, and $$T_{eqy} = \frac{3P\lambda_{mag}}{4}\sum_{n \in N} (\kappa_{e|y-n|} + \kappa_{e|y+n|})\kappa_{iqn} + T_{cqy} \quad (11)$$

$$T_{edy} = \frac{3P\lambda_{mag}}{4}\sum_{n \in N} (\kappa_{e|y-n|} + \kappa_{e|y+n|})\kappa_{idn} + T_{cdy} \quad (12)$$

represent coefficients of the Fourier series of torque ripple expressed in trigonometric form.

B. Mitigation of Torque Ripple

Mitigation of torque ripple involves three steps. Step 1 is to detect vibration corresponding to torque ripple. This is achieved using the sensor shown in FIG. 1. It is recognized the sensor is not measuring torque ripple directly. Rather, a propagation path is between the sensor output and the torque ripple input as shown in FIG. 2.

Figure 2:
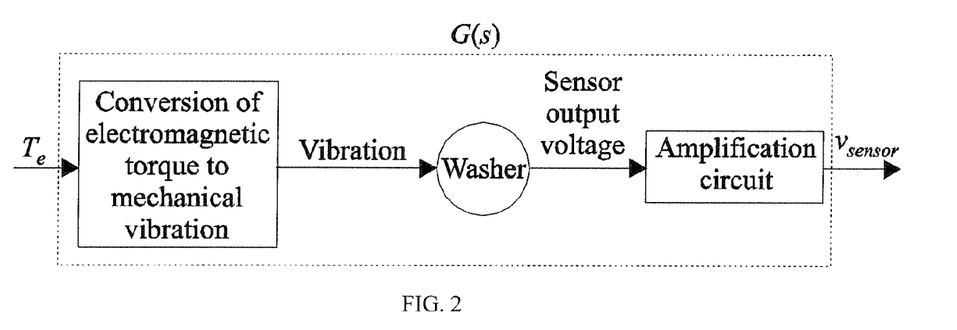
FIG. 2: Torque ripple to vibration sensor signal path.

From FIG. 2 it can be seen that the signal path includes the conversion of torque to mechanical vibration, the conversion of vibration into a voltage signal by the piezoelectric sensor, and an amplifier for gain and signal conditioning. The combination of these stages are grouped to form a single transfer function G(s) wherein the relationship between torque and sensor voltage can be expressed as $$v_{sensor} = G(s)T_e \quad (13)$$

where $v_{sensor}$ is the voltage of the piezoelectric sensor (after some conditioning described in [35]) measured at the DSP. To determine the vibration harmonics resulting from torque ripple, the voltage is multiplied (within a processor) by the sine and cosine functions of the desired torque ripple component. The product is then input into a 'leaky' integrator to extract the desired amplitude. Specifically, $$x_{eqy} = \int [v_{sensor}\cos(y\theta_r - \phi^*_{ydelay}) - \epsilon x_{eqy}]dt \quad (14)$$

$$x_{edy} = \int [v_{sensor}\sin(y\theta_r - \phi^*_{ydelay}) - \epsilon x_{edy}]dt \quad (15)$$

are voltages that are representative of the torque harmonics that are to be mitigated and $\phi^*_{ydelay}$ is the estimated sensor delay of the '$y^{th}$' ripple harmonic. The sensor delay results from the multiple components in the signal propagation path from torque ripple to measured vibration, and is considered in more detail in Step 3.

In Step 2, the stator currents are selected to mitigate torque ripple. This is achieved using the torque ripple mitigation algorithm presented in [35] described briefly herein. Specifically, a cost function is defined in terms of the machine torque ripple harmonics. The stator current harmonics that minimize the cost function are found using a gradient algorithm. The final algorithm is of the form $$\frac{d}{dt}i_{qh} = -\alpha 2K_{e1}^T Qx_{eq} \quad (16)$$

$$\frac{d}{dt}i_d = -\alpha 2K_{e2}^T Qx_{ed} \quad (17)$$

where $x_{eq} \in R^m$ and $x_{ed} \in R^m$ contain the measured vibration harmonic coefficients from (14) and (15) and $i_{qh} \in R^{(n-1)}$ is a vector representing the q-axis current harmonics (not including the fundamental), $i_d \in R^n$ is a vector that represents the d-axis current harmonics, $K_{e1} \in R^{mx(n-1)}$ and $K_{e2} \in R^{m \times n}$ contain coefficients of back-emf [scaled by $(0.75P\lambda_{mag})$], $Q \in R^{m \times m}$ is a diagonal matrix that contains components to weight overall cost in favor of one harmonic over another, and the scalar $\alpha$ is a control parameter used to adjust the time constant of the controller. The fundamental q-axis current harmonic ($\kappa_{eq1}$) is used to adjust the commanded average torque.

In Step 3, the sensor delay is calculated. To determine the sensor delay (which is speed dependent), an update to the control presented in [35] is required and is presented herein. Specifically for the $\theta_r$ defined, $T_{edy}$ will be zero provided that the d-axis current amplitudes are set to zero. Therefore, the measured d-axis component of torque-ripple-induced vibration ($x_{edy}$) provides a means to determine the sensor delay. Knowing that $x_{edy}=0$ when $\phi^*_{ydelay}=\phi_{ydelay}$, a simple integral control is used to determine $\phi_{ydelay}$. A block diagram is shown in FIG. 3.

Figure 3:
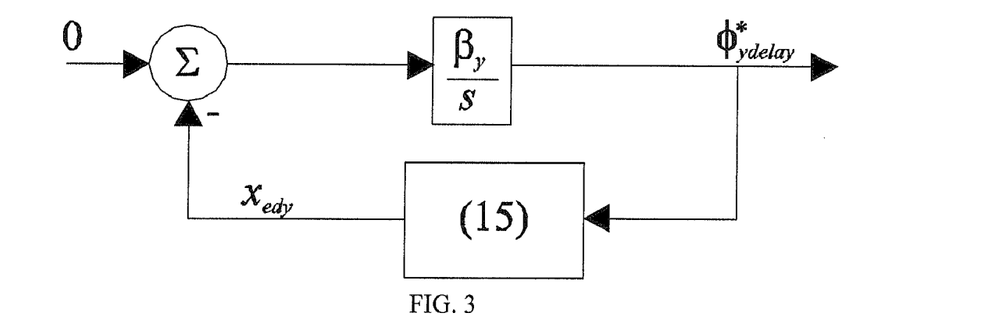
FIG. 3: Diagram of method used to establish the value of sensor delay.

From FIG. 3, it can be seen that the estimated delay is calculated using $$\phi^*_{ydelay}=\int\beta_y x_{edy}dt \tag{18}$$

where $\beta_y$ is a user-defined integration constant that is chosen so that the integration response of $\phi^*_{ydelay}$ is slower than that of the response of (14) and (15). The integration stops only when $x_{edy}=0$. From (15), it can be seen that multiple values of $\phi^*_{ydelay}$ can yield $x_{edy}=0$. However, it can be shown that only $\phi^*_{ydelay}=\phi_{ydelay}$ yields a solution that will maintain a steady-state value of $x_{edy}=0$ (i.e. others represent unstable operating points).

Figure 4:
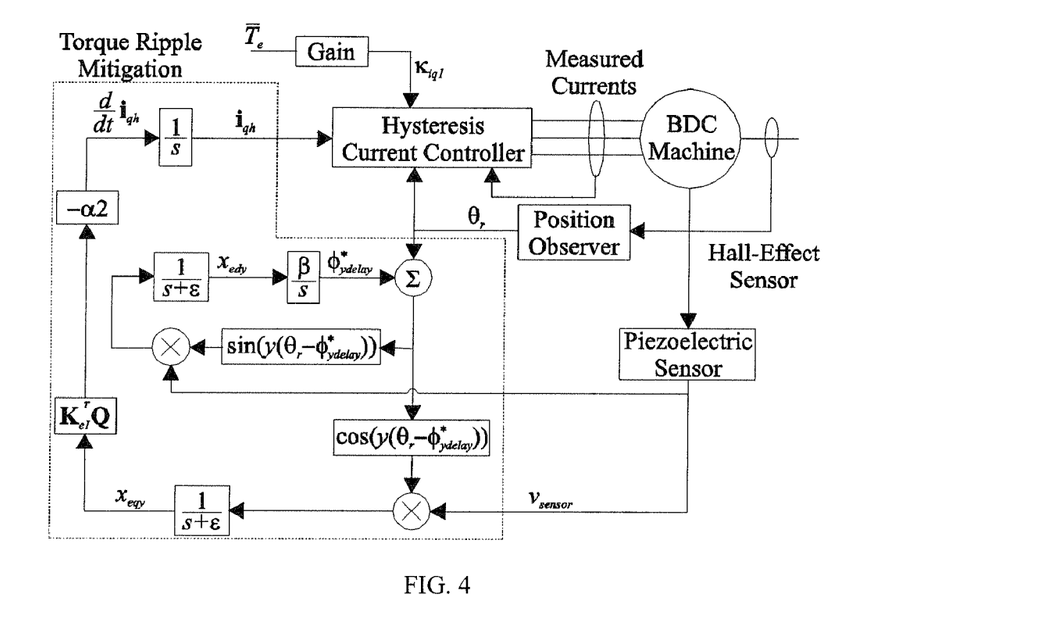
FIG. 4: Diagram of the torque ripple mitigation controller with position observer and vibration sensor delay compensation.

Under the updated torque ripple mitigation control with sensor delay, the d-axis stator current harmonics are set to zero to maintain a zero d-axis torque component, and the q-axis stator currents are controlled using (16) to eliminate torque ripple. A block diagram depicting the mitigation controller with sensor delay compensation is shown FIG. 4.

II. Position Observer

The CPSH position observer includes 2 components. The first component is the piezoelectric sensor that is used to establish rotor position. Specifically, at standstill three high-frequency-currents are applied to the machine to create torque-ripple-induced vibration. The three commanded currents are of the form $$i^*_{as}=-i^*_{bs}=I_s\cos(\omega_e t), i^*_{cs}=0 \tag{19}$$

$$i^*_{bs}=-i^*_{cs}=I_s\cos(\omega_e t), i^*_{as}=0 \tag{20}$$

$$i^*_{cs}=-i^*_{as}=I_s\cos(\omega_e t), i^*_{bs}=0 \tag{21}$$

where $\omega_e$ is the commanded electrical angular velocity and $I_s$ is the amplitude of the commanded current. In [36], it was shown that the sensor voltages resulting from the stator currents of (19)-(21) have the following form:

$$v_{sensorab} = \frac{P}{2}I_s k_s\left(\frac{\partial\lambda_{asm}(\theta_r)}{\partial\theta_r} - \frac{\partial\lambda_{bsm}(\theta_r)}{\partial\theta_r}\right)\cos(\omega_e t + \phi_s) \tag{22}$$

$$v_{sensorbc} = \frac{P}{2}I_s k_s\left(\frac{\partial\lambda_{bsm}(\theta_r)}{\partial\theta_r} - \frac{\partial\lambda_{csm}(\theta_r)}{\partial\theta_r}\right)\cos(\omega_e t + \phi_s) \tag{23}$$

$$v_{sensorca} = \frac{P}{2}I_s k_s\left(\frac{\partial\lambda_{csm}(\theta_r)}{\partial\theta_r} - \frac{\partial\lambda_{asm}(\theta_r)}{\partial\theta_r}\right)\cos(\omega_e t + \phi_s) \tag{24}$$

Equations (22)-(24) are obtained by substituting (19)-(21) into (1) and considering the torque to vibration signal path shown in FIG. 2. In (22)-(24) $k_s$ and $\phi_s$ are the gain and the phase of $G(s)$ at $\omega_e$. It is noted that only the time-varying component of $T_e$ propagates to the sensor. Since the rotor does not rotate during the excitation of (19)-(21) (average torque is zero, $I_s$ is sufficiently small and $\omega_e$ is sufficiently large so that the torque ripple doesn't translate into rotor motion), $T_{ecog}$ remains constant and is not detected by the sensor.

If the back-emf is a perfect sinusoid, a closed-form expression for $\theta_r$ can be established analytically by substituting (2) and (3) into (22)-(23) and simplifying. This yields, $$\tan(\theta_r) = \sqrt{3}\left(2\frac{v_{sensorab}}{v_{sensorbc}} - 1\right)^{-1} \tag{25}$$

Alternative expressions for $\theta_r$ can be found for alternative ratios of (22)-(24). Specifically, $$\tan(\theta_r + 60) = \sqrt{3}\left(2\frac{v_{sensorbc}}{v_{sensorca}} - 1\right)^{-1} \tag{26}$$

$$\tan(\theta_r - 60) = \sqrt{3}\left(2\frac{v_{sensorca}}{v_{sensorab}} - 1\right)^{-1} \tag{27}$$

Although the closed form expressions of (25)-(27) are only exact for a machine with a pure sinusoidal back-emf, the calculation has a very high accuracy for non-sinusoidal back-emf machines. Specifically, if one considers a trapezoidal-back-emf machine, it can be shown numerically that using (25)-(27) to approximate position results in an error of less than 3° (electrical). It is noted that any one of (25)-(27) can be used to determine position; however, calculating all three and taking an average has been found to be most effective in terms of reducing error associated with measurement noise as shown in [36].

Figure 5:
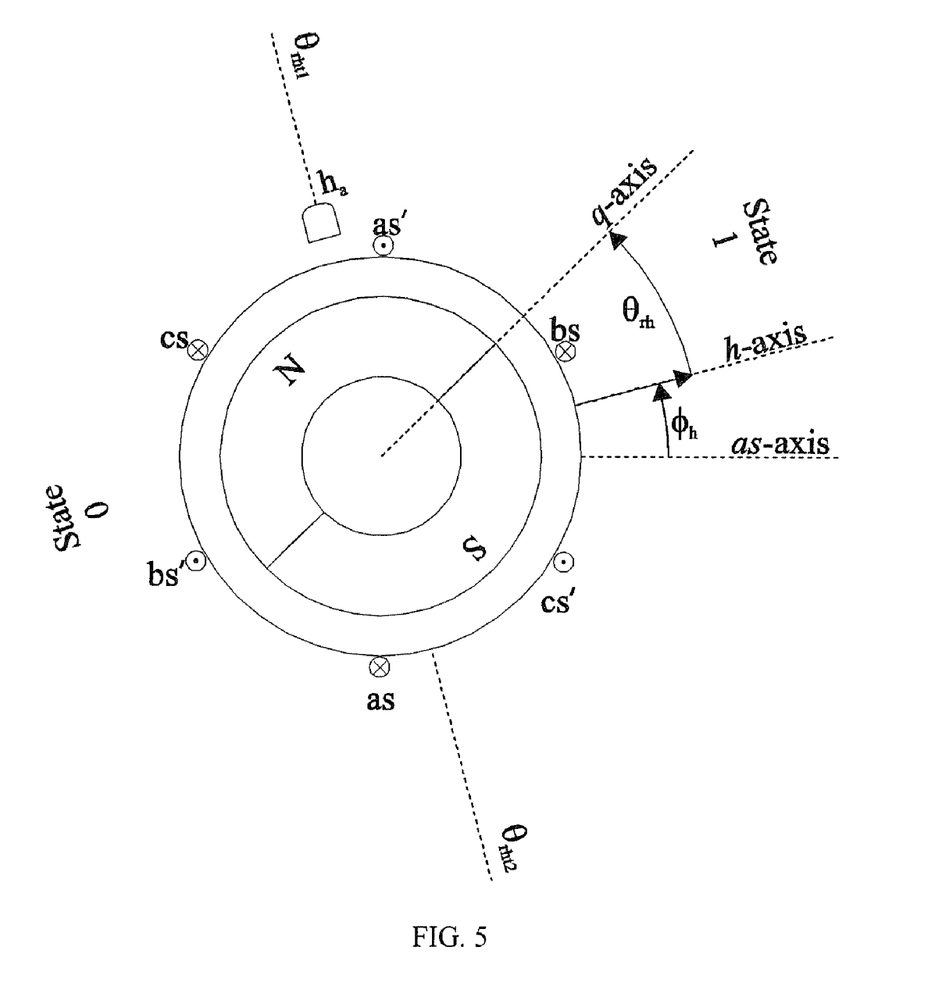
FIG. 5: Diagram of Hall-effect sensor states relative to rotor position ()

The second component of the CPSH observer uses the Hall sensor to provide rotational based estimation. Prior to describing the component, it is useful to define angles and axes used in its derivation. For simplicity, and without lack of generality, position angles are defined using the cross-sectional view of a 2-pole machine shown in FIG. 5. Therein, the angle $$\theta_r = \theta_{rh} + \phi_h \tag{28}$$

is shown where $\theta_r$ is defined as the angle between the q-axis and the as-axis, $\theta_{rh}$ is defined as the angle between the q-axis and the h-axis (herein defined orthogonal to the location of the phase-a Hall-effect sensor), and $\phi_h$ is the angle between the h-axis and the as-axis. In the machine used, the Hall-effect sensor (labeled $h_a$,) is mounted on the inside of the endplate.

The observer proposed utilizes transitions in sensor states to detect position. Ideally, transitions occur at every $\pi$ interval with the first occurring at $\pi/2$ radians relative to the h-axis, as shown in FIG. 5. Transition angles, labeled as $\theta_{rhti}$, relative to sensor states are shown in Table 1.

TABLE 1

Hall-effect state transition points

| | $\theta_{rhti}$ (radian) | |
|---|---|---|
| $h_a$ | Ideal | Measured |
| 0 | 1.57 | 1.57 |
| 1 | 4.71 | 4.77 |

To estimate the rotor position between state transitions, the angle is updated using $$\theta_{rh} = \int \overline{\omega}_r dt + \theta_{rhti} \quad (29)$$

where $\theta_{rhti}$ is the angle at the 'ith' transition and $\overline{\omega}_r$ is the average rotor angular velocity during the previous Hall-effect sensor state.

The average rotor speed is determined from $$\overline{\omega}_r = \frac{\Delta \theta_{rh}}{\Delta t} \quad (30)$$

where $\Delta \theta_{rh}$ is the angular displacement of the rotor position over the previous Hall-effect sensor state and $\Delta t$ is the difference in time between transitions.

It can be seen from (29) that if the rotor speed varies between Hall-effect transitions there is error in the estimation of rotor position. To set a maximum limit of error allowed in the calculation, the sensor state in which the rotor is located is used to set the bounds of the integration of (29).

It is noted that in Table 1, ideal and measured values have been entered for each state. The ideal values assume that the sensor transitions occur at every $\pi$ radians. However, manufacturing tolerances result in offsets in the placement of the permanent magnets which result in errors in transition angles. Such offsets can usually be neglected if the goal is to achieve a commanded average torque. However, it has been found that these errors cannot be neglected if the goal is to mitigate torque ripple.

To compensate for the non-ideal magnet placement, while maintaining the ease of implementation of the overall control, an automated process is developed to obtain the measured values. The automated routine is started by implementing an observer wherein the ideal values are stored in the lookup table (Table 1). The motor is then driven using a commanded fundamental component of current. While the motor is running, the time between Hall-effect transitions over a complete electrical cycle is captured. From this information, the values in the lookup tables are recalculated. Iterations over several electrical cycles are performed until a desired tolerance is obtained. A flow chart of the process is shown in FIG. 6.

In hardware testing, the observer was able to determine a rotor position ±0.1° electrical with respect to the h-axis in approximately 0.1 s. In testing across multiple machines, it has been observed that an error of less than ±0.7° electrical is needed for effective torque ripple mitigation.

Figure 6:
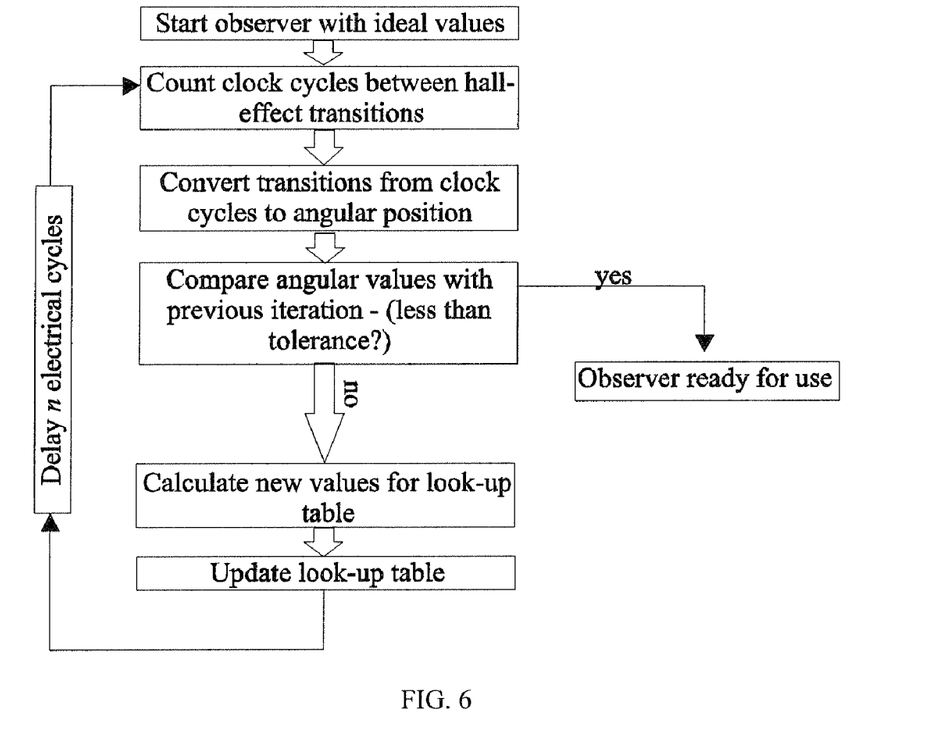
FIG. 6: Flow chart of process used to determine location of the Hall-effect state transitions.

The routine outlined in FIG. 6 establishes the angles needed to compute $\theta_{rh}$. However, for control, the angle $\theta_r$ is required; therefore, the offset angle from the h-axis to the as-axis ($\phi_h$) is required. An approximate value for the angle is sometimes provided by the manufacturer; however, a more precise value is required for ripple mitigation.

To establish $\phi_h$, a calibration routine is operated wherein the commanded phase-a current is set to $$I^*_{as} = I_s \cos(\omega_r t + \phi^*_h) \quad (31)$$

The phase-b and phase-c currents are displaced by 120° and 240° respectively. In (31), $\phi^*_h$ represents an estimate to $\phi_h$.

Under this condition it can be shown that the average torque can be expressed as $$\overline{T}_e = \frac{3P\lambda_{mag}}{4} \kappa_{e1} I^*_s \cos(\phi_h - \phi^*_h) \quad (32)$$

In steady-state, the average rotor speed can be expressed $$\overline{\omega}_r = \frac{3P\lambda_{mag}}{4B_m} \kappa_{e1} I^*_s \cos(\phi_h - \phi^*_h) - \frac{\overline{T}_l}{B_m} \quad (33)$$

where $\overline{T}_l$ is the average load torque applied to the motor and $B_m$ is the damping coefficient.

Figure 7:
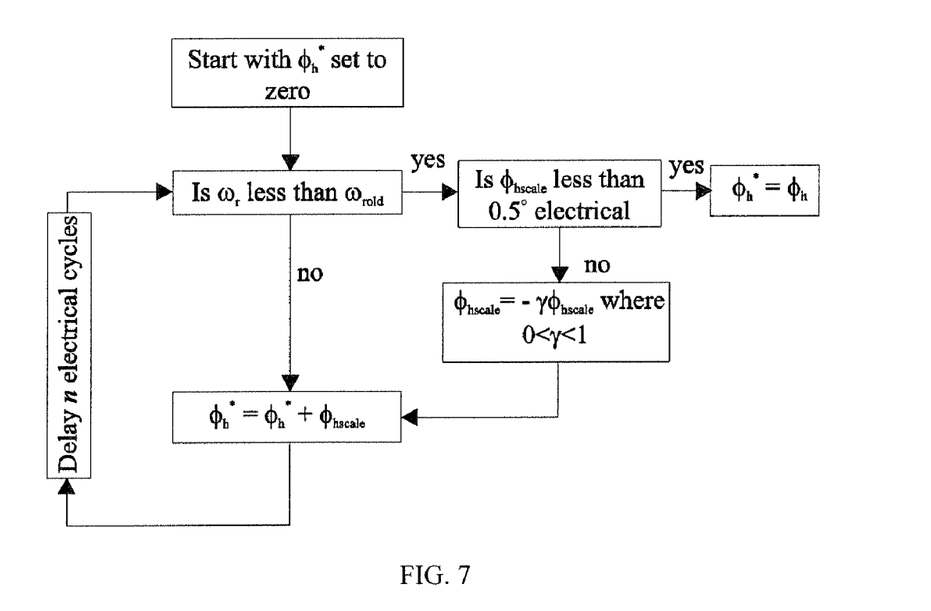
FIG. 7: Flow chart of h-axis offset calculation routine.

From (33), it is noted that the maximum steady state rotor speed occurs when $\phi^*_h = \phi_h$. Therefore, an iterative routine is developed to determine $\phi_h$. To begin, an initial value of the angle is set to $\phi^*_h = 0$. The current is applied and a steady-state speed is established. Once a steady-state is established, $\phi^*_h$ is adjusted using $$\phi^*_h = \phi^*_h + \phi_{hscale} \quad (34)$$

where $\phi_{hscale}$ is a fixed value (herein 10° electrical was used). If the rotor speed increases, (34) is repeated. However, if a decrease in rotor speed is detected, the offset angle is modified by $$\phi_{hscale} = -\gamma \phi_{hscale} \quad (35)$$

where $0 < \gamma < 1$. This process is iterated until $\phi_{hscale}$ is less than 0.5° electrical. The routine is exited and the value of $\phi^*_h$ that yielded the maximum rotor speed is stored. The overall process is shown in FIG. 7.

This iterative routine determines $\phi_h$ accurately unless $\phi^*_h = \phi_h \pm 90°$. From (33), such an offset will result in zero steady-state rotor speed and no new Hall-effect state transition to update $\phi^*_h$. To avoid the motor stalling with $\phi^*_h$ out of phase, a timer is coupled to determine if the motor has slowed below an acceptable speed. If so, the angle $\phi^*_h$ is shifted 90° and the iteration cycle started at the beginning.

In hardware testing, the time required to determine $\phi_h$ has been found to be roughly 5.5 s. Therefore, the combined time of the startup routines (FIG. 6 and FIG. 7) is approximately 5.6 s for the motor used in the experimental validation (described in Section IV). It is important to note that these routines only need to be performed once as part of an initial commissioning, since the values of Hall-effect transitions and $\phi_h$ remain unchanged for the life of the drive.

Figure 8:
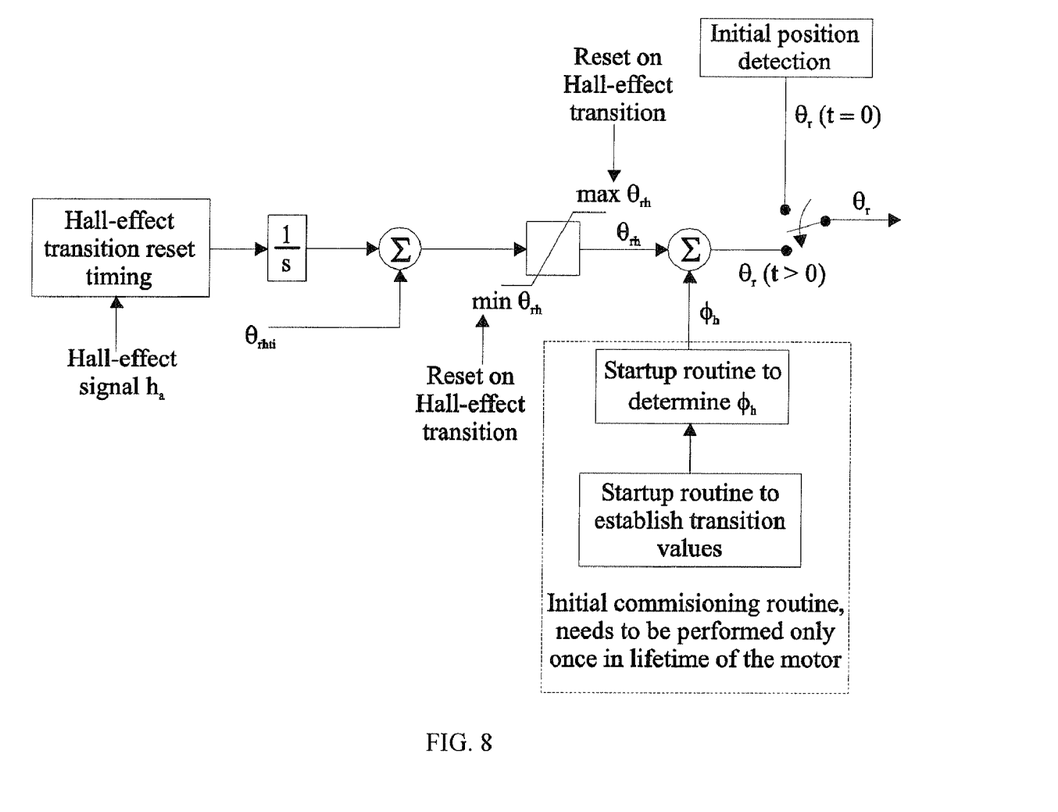
FIG. 8: Block diagram of position observer.

A block diagram of the overall position observer is shown in FIG. 8.

Results

For hardware validation of the position observer, the PMSM whose parameters are shown in Table 2 was driven using an inverter operating under hysteresis control. For stator current feedback of the hysteresis control, the current was measured using a F.W. Bell CLN-50 current sensor. The machine was loaded by coupling the motor to a Magtrol HD-815-6N hysteresis-brake dynamometer operated at a constant torque load.

TABLE 2

Machine parameters

| $L_{ss} = 499.7\ \mu H$ | $r_s = 0.174\ \Omega$ |
|---|---|
| $\lambda_m = 0.0446\ Vs$ | $P = 8.0$ |

For implementation, a floating point TMS 320C6711 DSP was used for the position observer and torque ripple mitigation control. The position observer and torque ripple mitigation algorithm were programmed using the C++ language format. The DSP used in testing was chosen merely for its availability and ease of student use. It is recognized that in many commercial drives, fixed-point processors are used. All techniques developed herein are readily implemented using a fixed-point processor.

For the first test case, the motor was energized from standstill to determine the performance of the observer during startup. For the estimation of the initial position of the rotor, the currents of (19)-(21) were used as the commanded input to the drive wherein values of $I_s = 0.8$ A (5% of rated) and $\omega_e = 2000\pi$ were selected. The motor was energized at 0.05 s with the q-axis current set to 10 A and the d-axis current set to zero, and the dyno was set to a constant load of 2.5 Nm. For comparison of the performance of the observer, the same test was also performed with an optical encoder. The current and rotor velocity during this transition are shown in FIG. 9-FIG. 10.

Figure 9:
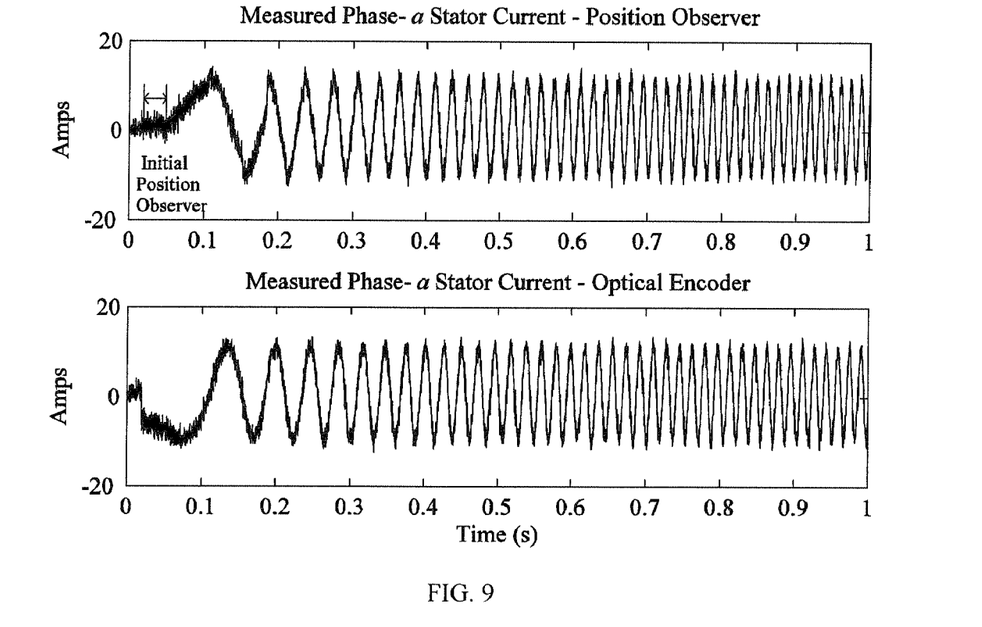
FIG. 9: Measured phase current during start-up with the position observer and an optical encoder.
Figure 10:
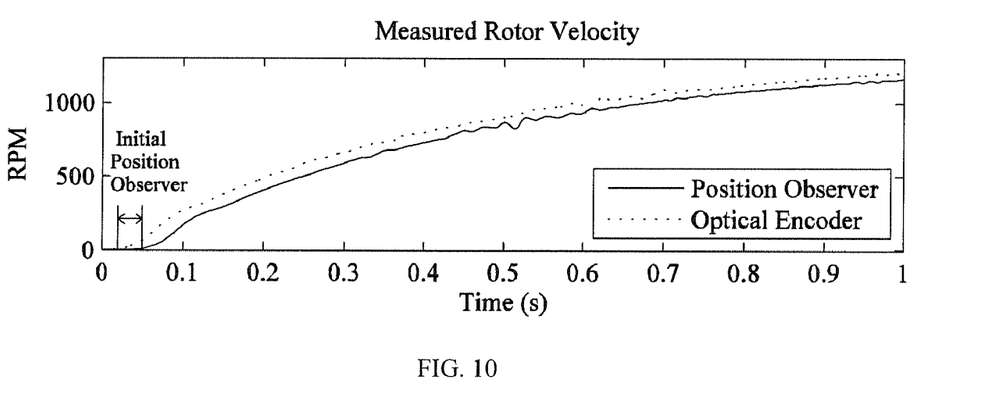
FIG. 10: Rotor velocity during start-up with the position observer and an optical encoder.

From FIG. 9, it can be seen that there is no reverse rotation of the rotor during startup, although the Hall-effect transitions are noticeable in the current. Specifically, the sensor transitions result in discontinuities in the stator current that result from errors in the estimation rotor position during transients in rotor velocity. This is an inherent property of Hall-effect based position observers, however this error goes to zero as acceleration goes to zero. Despite these errors in position, it can be seen from FIG. 10 that the startup performance of the position observer is very close to that obtained by the optical encoder.

For the second test case, the position observer is coupled with the torque ripple mitigation algorithm described in Section II. The mitigation control was implemented to monitor two torsional harmonics and manipulate three current harmonics. Specifically the controller was such that $\kappa_{iq1}$ was used to track an average commanded torque, while mitigation of the 6th and 12th torque ripple induced harmonics was accomplished using $$\frac{d}{dt}\begin{bmatrix} \kappa_{iq5} \\ \kappa_{iq11} \end{bmatrix} = -\alpha 2 \begin{bmatrix} q_{11} & 0 \\ 0 & q_{22} \end{bmatrix}\begin{bmatrix} x_{eq6} \\ x_{eq12} \end{bmatrix} \quad (36)$$

Figure 11:
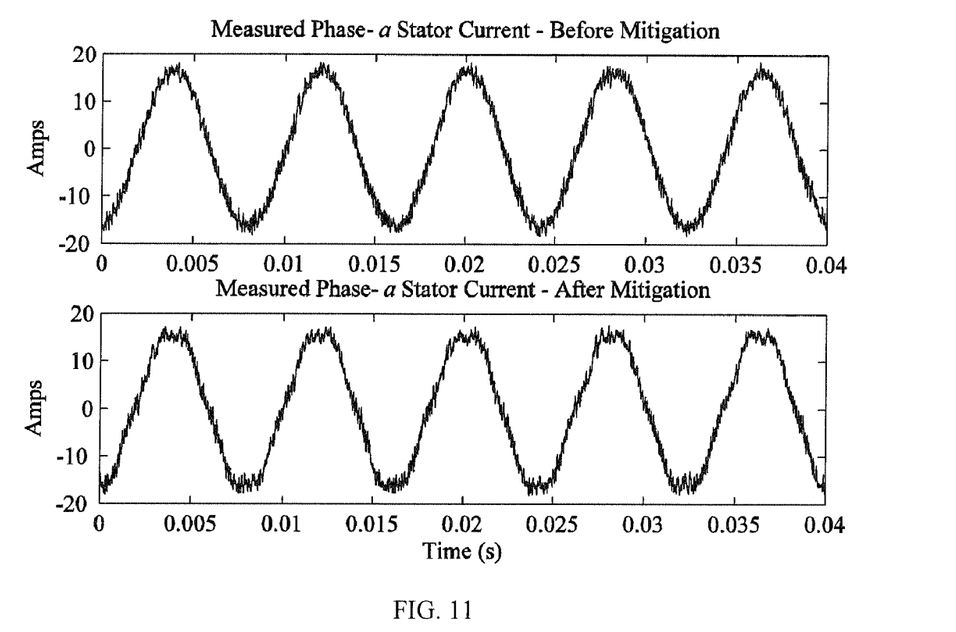
FIG. 11: Measured phase current before and after implementation of torque ripple mitigation control.
Figure 12:
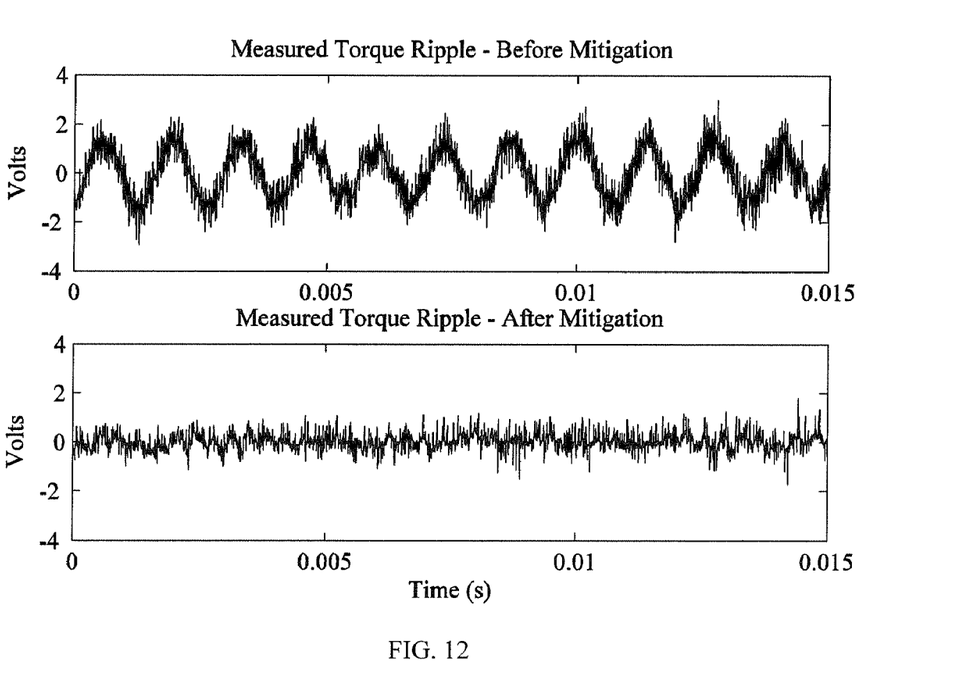
FIG. 12: Measured torque ripple before and after implementation of torque ripple mitigation control.

The d-axis current harmonics were set to zero. Results of the current and torque harmonics before and after the mitigation control are shown in FIG. 11-FIG. 12.

Figure 13:
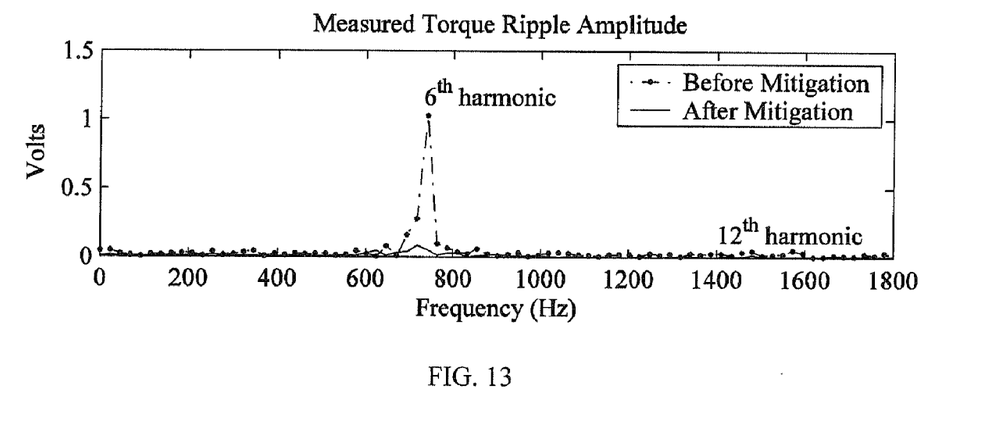
FIG. 13: Frequency domain of the torque ripple sensor before and after implementation of torque ripple mitigation control.

Viewing the measured response after the ripple mitigation control was executed, it is seen that some 5th and 11th harmonic is present in the stator current waveform and the 6th and 12th harmonics of torque ripple are greatly reduced. For further insight into the controller effectiveness, a frequency domain plot of the torque ripple was obtained for the test and is shown in FIG. 13.

The frequency domain plot shows the substantial reduction in ripple—the magnitude of 6th torque ripple harmonic is close to the noise floor after the control was applied.

To determine the response of the system to a load change, the same system above is implemented with the mitigation controller in steady-state. A step change in commanded load torque from 1.25 Nm to 5.0 Nm is then applied. The measured current and torque ripple during the transition are shown in FIG. 14.

Figure 14:
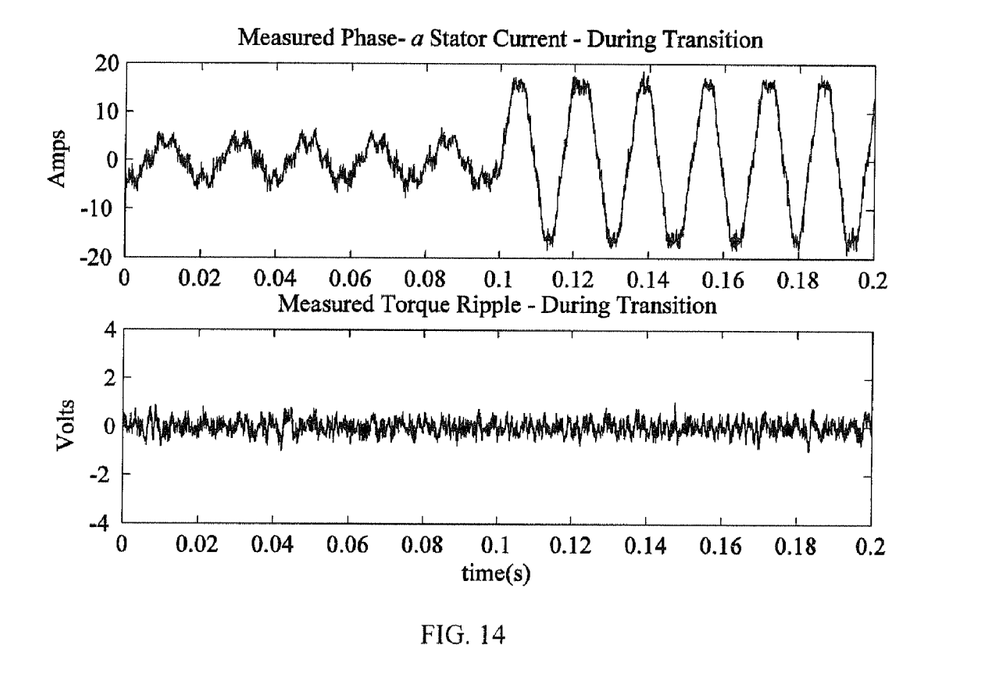
FIG. 14: Measured current and torque ripple during a step change in average commanded torque.

From FIG. 14, it can be seen that the system achieves a steady-state quickly after the transient and that there is negligible torque ripple before and after the transient.

III. Conclusions

A low-cost position observer has been developed that enables a drive designer to achieve near maximum starting torque and is shown to be suitable for control-based mitigation of torque ripple. The observer includes a piezoelectric sensor serving in a secondary role to determine initial position and a single Hall-sensor to estimate rotational position. A configuration routine is also derived to determine the exact location of Hall-effect transitions, despite errors in magnet placement that result from limits of manufacturing. The results point to the applicability of utilizing control-based methods to mitigate torque ripple in mass-produced drive systems.

While the invention has been illustrated and described in detail in the drawings and foregoing description, the same is to be considered as illustrative and not restrictive in character, it being understood that only preferred embodiments have been shown and described and that all changes and modifications that come within the spirit of the invention are desired to be protected.

The following paper is incorporated herein by reference along with all references cited therein: Steve Pekarek and Philip Beccue, "Using Torque-Ripple-Induced Vibration to Determine the Initial Rotor Position of a Permanent Magnet Synchronous Machine," IEEE Transactions on Power Electronics, Vol. 21, No. 3, May 2006, pp. 818-821. The following references are also incorporated herein by reference:

REFERENCES

[1] V. Olarescu, S. Musuroi, "Enhanced simplified control algorithm for surface-mounted permanent magnet synchronous motors with sinusoidal excitation," *IEEE proceedings from the International Power Electronics and Motion Control Conference*, August 2004, pp. 1049-1053.

[2] K. A. Corzine, S. D. Sudhoff, "A hybrid observer for high performance brushless DC motor drives," *IEEE Transaction on Energy Conversion*, Vol. 11, No. 2, pp. 318-323, June 1996.

[3] X. Zheng, L. Tiecai, L. Yongping, G. Bingyi, "Position-measuring error analysis and solution of hall sensor in pseudo-sensorless PMSM driving system," *IEEE proceedings from the Industrial Electronics Conference*, November 2003, pp. 1337-1342.

[4] Z. Zhao-yong, Z. Zheng, L. Tie-cai, "FPGA implementation of a new hybrid rotor position estimation scheme based on three symmetrical locked Hall effect position sensors," *IEEE proceedings from the International Power Electronics and Motion Control Conference*, August 2004, pp. 1592-1596.

[5] Z. Jibin, X. Yongxiang, H. Jianhui, Z. Hongwei, "Sinusoidal commutation of a high-speed PM synchronous motor with one discrete Hall sensor," *IEEE proceedings from the International Power Electronics Congress*, October 2002, pp. 115-119.

[6] J. Shen, Z. Zhu, D. Howe, "PM brushless drives with low-cost and low-resolution position sensors," *IEEE proceedings from the International Power Electronics and Motion Control Conference*, August 2004, pp. 1033-1038.

[7] J. Bu, L. Xu, T. Sebastian, B. Liu, "Near-zero speed performance enhancement of PM synchronous machines assisted by low-cost Hall effect sensors," *IEEE proceedings from the Applied Power Electronics Conference*, February 1998, pp. 64-68.

[8] F. Capponi, G. Donato, L. Ferraro, O. Honorati, M. Harke, R. Lorenz, "AC brushless drive with low resolution Hall-effect sensors for an axial flux PM machine," *IEEE proceedings from the Industry Application Conference*, October 2004, pp. 2382-2389.

[9] H. Le-Huy, R. Perret, R. Feuillet, "Minimization of torque ripple in brushless DC motor drives," *IEEE Transactions on Industry Applications*, Vol. 22, No. 4, pp. 803-813, July/August 1986.

[10] C. Kang, I. Ha, "An efficient torque control algorithm for BLDCM with a general shape back-emf," *PESC Record-Power Electronics Specialists Conference*, 1993, pp. 451-457.

[11] D. C. Hanselman, "Minimum torque ripple, maximum efficiency excitation of brushless permanent magnet motors," *IEEE Transactions on Industrial Electronics*, Vol. 41, No. 3, pp. 292-300, June 1994.

[12] R. Leidhold, G. Garcia, and E. Watanabe, "PMAC motor control strategy, based on the instantaneous active and reactive power, for ripple-torque and copper-losses minimization," *IEEE Proceedings from the Industrial Electronics Society Conference*, October 2000, pp. 1401-1405.

[13] S. Park, H. Park, M. Lee, and F. Harashima, "A new approach for minimum-torque ripple maximum-efficiency control of BLDC motor," *IEEE Transactions on Industrial Electronics*, Vol. 47, No. 1, pp. 109-114, February 2000.

[14] C. D. Angelo, G. Bossio, G Garcia, J. Solsona, M. I. Valla, "Sensorless speed control of permanent magnet motors with torque ripple minimization," *IEEE proceedings from the Industrial Society Annual Conference*, November 2002, pp. 680-685.

[15] P. L. Chapman, S. D. Sudhoff, C. A. Whitcomb, "Optimal current control strategies for surface-mounted permanent-magnet synchronous machine drives," *IEEE Transactions on Energy Conversion*, Vol. 14, No. 4, pp 1043-1050, December 1999.

[16] A. Wu and P. Chapman, "Cancellation of torque ripple due to nonidealities of permanent magnet synchronous machine drives," *IEEE Proceedings from the Power Electronics Specialist Conference*, June 2003, pp. 256-261.

[17] J. Holtz and L. Springob, "Identification and compensation of torque ripple in high-precision permanent magnet motor drives," *IEEE Transactions on Industrial Electronics*, Vol. 43, No. 2, pp. 309-320, April 1996.

[18] S. Chen, A. Song, and T. Sekiguchi, "High efficiency and low torque ripple control of permanent magnet synchronous motor based on the current tracking vector of electromotive force," *IEEE Proceedings from the Industrial Applications Conference*, October 2000, pp. 1725-1729.

[19] J. Hung and Z. Ding, "Design of currents to reduce torque ripple in brushless permanent magnet motors," *IEE Proceedings Part B from Electric Power Applications*, Vol. 140, No. 4, pp 260-266, July 1993.

[20] S. Clenet, Y. Lefèvre, N. Sadowski, S. Astier, and M. Lajoie, "Compensation of permanent magnet motors torque ripple by means of current supply waveshapes control determined by finite element method," *IEEE Transactions on Magnetics*, Vol. 29, No. 2, pp. 2019-2023, March 2003.

[21] T. Liu, I. Husain, and M. Elbuluk, "Torque ripple minimization with on-line parameter estimation using neural networks in permanent magnet synchronous motors," *IEEE Proceedings from the Industry Applications Conference*, October 1998, pp. 35-40.

[22] T. S. Low, K. J. Tseng, T. H. Lee, K. W. Lim, and K. S. Lock, "Strategy for the instantaneous torque control of permanent-magnet brushless DC drives," *IEE Proceedings Part B from Electric Power Applications*, Vol. 137, No. 6, November 1990, pp. 355-363.

[23] N. Matsui, T. Makino, and H. Satoh, "Autocompensation of torque ripple of direct drive motor by torque observer," *IEEE Transactions on Industry Applications*, Vol. 29, No. 1, pp. 187-194, January/February 1993.

[24] T. Low, T. Lee, K. Tseng, and K. Lock, "Servo performance of a BLDC drive with instantaneous torque control," *IEEE Transactions on Industrial Applications*, Vol. 28, No. 2, pp. 455-462, March/April 1992.

[25] G. Ferretti, G. Magnani, and P. Rocco, "Torque ripple adaptive rejection in brushless motors," *IEEE/ASME Proceedings from the International Conference on Advanced Intelligent Mechatronics*, September 1999, pp. 329-334.

[26] F. Colamartino, C. Marchand, and A. Razek, "Considerations of non-sinusoidal field distribution in a permanent magnet synchronous motor control," *IEE Proceedings from the Power Electronics and Variable-Speed Drives Conference*, October 1994, pp. 508-513.

[27] S. Li, Z. Zhizhong, and L. Yongping, "Compensation of ripple torque of inverter-fed PM synchronous motors," *IEEE Proceeding from the American Control Conference*, June 2000, pp. 1597-1601.

[28] F. Parasiliti, R. Petrella, M. Tursini, "Torque ripple compensation in permanent magnet synchronous motors based on Kalman Filter," *IEEE Proceedings from International Industrial Electronics*, July 1999, pp. 1333-1338.

[29] F. Colamartino, C. Marchand, and A. Razek, "Torque ripple minimization in a permanent magnet synchronous servodrive," *IEEE Transactions on Energy Conversion*, Vol. 14, No. 3, pp. 616-621, September 1999.

[30] O. Bogosyan, M. Gokasan, and A. Sabanovic, "Robust-adaptive linearization with torque ripple minimization for a PMSM driven single link arm," *IEEE Proceedings from the International Conference on Industrial Electronics, Control, and Instrumentation*, November 1997, pp. 102-107.

[31] V. Petrovic, R. Ortega, A. M. Stankovic, and G. Tadmor, "Design and implementation of an adaptive controller for torque ripple minimization in PM synchronous motors," *IEEE Transactions on Power Electronics*, Vol. 15, No. 5, pp. 871-880, September 2000.

[32] W. Qian, S. Panda, and J. Xu, "Torque ripple minimization in PM synchronous motors using iterative learning control," *IEEE Transactions on Power Electronics*, Vol. 19, No. 2, pp. 272-279, March 2004.

[33] T. Su, S. Hattori, M. Ishida, T. Hori, "Suppression control method for torque Vibration of AC motor utilizing repetitive controller with Fourier transform," *IEEE Transactions on Industry Applications*, Vol. 38, No. 5, pp. 1316-1325, September/October 2002.

[34] P. Beccue, J. Neely, S. Pekarek, D. Stutts, "Utilization of a piezoelectric polymer to sense harmonics of electromagnetic torque," *IEEE Power Electronics Letters*, Vol. 1, No. 3, pp. 69-73, September 2003.

[35] P. Beccue, J. Neely, S. Pekarek, D. Stutts, "Measurement and control of torque ripple-induced frame torsional vibration in a surface mount permanent magnet machine," *IEEE Transactions on Power Electronics,* Vol. 20, No. 1, pp. 182-191, January 2005.

[36] S. Pekarek, P. Beccue, "Using Torque-Ripple Induced Vibration to Determine the Initial Rotor Position of a PM Synchronous Machine," Accepted for Publication in *IEEE Power Electronics Letters*

[37] P. C. Krause, O. Wasynczuk, S. D. Sudhoff, Analysis of electric machinery, IEEE Press, 1995.

We claim:

1. A method of estimating the rotor position of a permanent magnet synchronous machine, comprising:
    employing a first sensor, other than a magnetic field sensor, to provide data at low operating speeds of said synchronous machine, said first sensor being sensitive to torque ripple and capable of generating a signal suitable for use as a torque ripple feedback signal in a torque ripple mitigation algorithm;
    employing a second sensor, of a different type than said first sensor, to provide data at high operating speeds of said synchronous machine; and
    processing said data from said first and second sensors to determine the rotor position of said permanent magnet synchronous machine over a wide range of speeds including low and high speeds.

2. The method of claim 1, wherein said low operating speeds of said synchronous machine include substantially zero speed.

3. The method of claim 2, wherein said first sensor is a vibration sensor.

4. The method of claim 3, wherein said first sensor is a piezoelectric sensor.

5. The method of claim 4, wherein said second sensor is a Hall-effect sensor.

6. The method of claim 5, further comprising the step of integrating rotor velocity to estimate rotor position between Hall-effect sensor transitions.

7. The method of claim 6, further comprising:
    applying stator excitation to said synchronous machine at substantially zero speed to induce vibration;
    sensing said vibration with said first sensor while said synchronous machine is at substantially zero speed; and
    determining the initial rotor position of said synchronous machine from said induced vibration as sensed at substantially zero speed by said first sensor.

8. The method of claim 7, wherein a sequence of stator excitations is applied to said synchronous machine to induce a sequence of torque-ripple-induced vibrations, and a ratio of sensed vibrations is used to determine the initial position of the rotor.

9. A method of determining the rotor position of an electric machine having a rotor mounted within a stator and driven by a rotating magnetic field generated by excitation of said stator with an alternating current, comprising:
    applying stator excitation to said stator of said electric machine; and
    using torque-ripple-induced vibration to determine the rotor position of said rotor within said stator of said electric machine.

10. The method of claim 9, wherein said applying includes applying a sequence of stator excitations to said electric machine to induce a sequence of torque-ripple-induced vibrations, and wherein a ratio of sensed vibrations is used to determine the position of the rotor.

11. The method of claim 6, further comprising:
    applying high-frequency stator excitation to said synchronous machine at substantially zero speed to create torque-ripple-induced vibration;
    sensing said induced vibration with said first sensor; and
    determining the initial rotor position of said synchronous machine from said induced vibration as sensed by said first sensor.

\* \* \* \* \*